United States Patent [19]

Demars, Jr.

[11] Patent Number: 4,791,754

[45] Date of Patent: Dec. 20, 1988

[54] PLANT ASSISTING DEVICE

[76] Inventor: George H. Demars, Jr., Rte. 2, Bovey, Minn. 55709

[21] Appl. No.: 72,766

[22] Filed: Jul. 13, 1987

[51] Int. Cl.$^4$ ............................................. A01G 13/02
[52] U.S. Cl. .......................................... 47/29; 47/30
[58] Field of Search ................... 47/29, 26, 27, 28, 30, 47/31, 32, 20, 45, 47, 44

[56] References Cited

U.S. PATENT DOCUMENTS

| 327,510 | 10/1885 | Anderson | 47/26 |
|---|---|---|---|
| 2,785,508 | 3/1957 | Coleman, Jr. | 47/32 |
| 3,515,373 | 6/1970 | Abbe | 47/33 |
| 3,611,633 | 10/1971 | Shockelford | 47/27 |
| 3,704,545 | 12/1972 | Van Reisen | 47/29 |

FOREIGN PATENT DOCUMENTS

| 730040 | 8/1932 | France | 47/26 |
|---|---|---|---|
| 1434817 | 2/1966 | France | 47/26 |

Primary Examiner—Robert A. Hafer
Assistant Examiner—Danton D. DeMille
Attorney, Agent, or Firm—Peterson, Wicks, Nemer & Kamrath

[57] ABSTRACT

A device for assisting the growth of a plant by providing shelter and physical support therefor is taught in the preferred embodiment of a modular construction including a tubular section, a cover, and a collar. The collar provides a gradually curving continuous support to the upper growth portion of the plant for helping to reduce breakage of the plant from bending due to the weight of the plant. In the preferred embodiment, the collar includes arcuate sections of varying radii, with the first arcuate section connected tangentially to the tubular section, with the second arcuate section extending radially outwardly and continuously from the first arcuate section, and with the third arcuate section connected to and extending radially outwardly, downwardly, and continuously from the second arcuate section. An outer rim extends from the third arcuate section for reinforcing the collar. The collar is removably connected to the tubular section allowing the separate fabrication of the collar and the tubular section. The cover provides a weather barrier for the plant and is removably received either in the tubular section or in the collar.

20 Claims, 1 Drawing Sheet

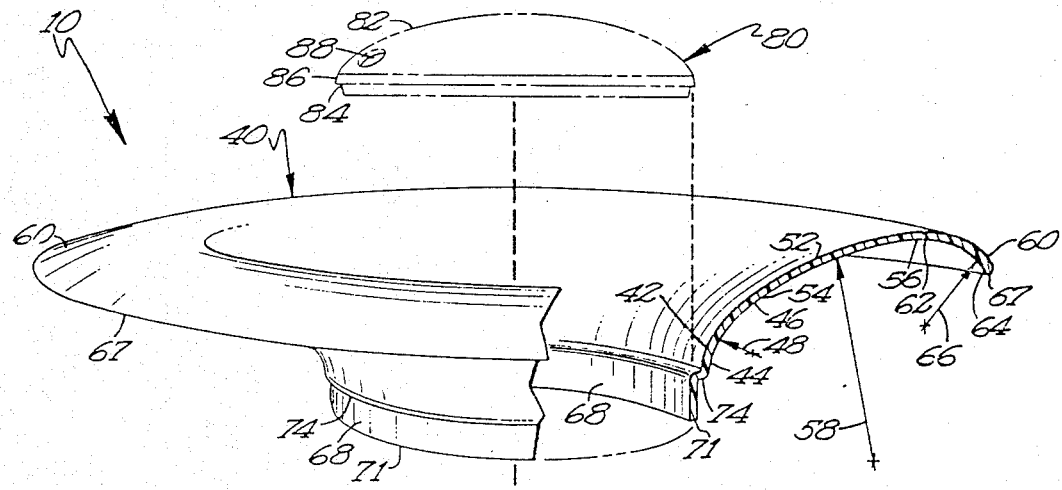

PLANT ASSISTING DEVICE

BACKGROUND

The present invention relates generally to devices for assisting the growth of a plant, particularly to devices for both protecting plants from certain weather and environmental conditions and for providing physical support to the plant.

Young and delicate plants are customarily set outdoors directly from seed flats early in the growing season. For example, plants such as tomato plants are often set out in the spring without the benefit of weather protection. This results in the loss of many young plants due to weather conditions.

In the past to reduce plant loss due to weather conditions, various protective covers or "hot caps" have been used. The devices may be translucent and are generally entirely closed to the atmosphere or have been provided with an aperture communicating with the atmosphere. Neither of these conditions is desirable at all times, however, for it is sometimes necessary to completely enclose the plant part of the time, such as at night or during stormy weather, while it is unnecessary and a disadvantage to give more than partial protection during the daytime or during good weather. Heretofore, the construction of such hot caps or the method of anchoring them to the soil has made it impractical to adjust the degree of protection provided.

As a tomato plant matures, it begins sprouting branches or vines which eventually bear the tomatoes themselves. As tomatoes appear on the vine, the combined weight of the tomatoes and vines causes the plant to bend, possibly breaking, and eventually the vines and tomatoes rest on the ground. Tomatoes contacting the soil rapidly decay and are more subject to attack by insects and small animals. In addition, if the plant vines and tomatoes are not supported above the soil, it is extremely difficult to till the soil surrounding the plant. Also, harvesting the tomatoes is much more labor intensive when plant support is not provided. Thus lack of provision for support of the plant results in less yield of usable produce due to bending and breaking of the plant and also due to some of the produce contacting the soil and decaying In the past, support for tomato plants has sometimes been provided by "staking" the plants. This involves driving a long wooden stake into the ground adjacent to the plant. The stalk of the tomato plant is then tied to the stake. A disadvantage of this approach is that the initial staking is labor intensive and repeated tieing of the plant is required as the plant matures.

Other previous plant supporting devices have utilize wire like constructions for the support of the plant. The small diameter of the supporting wire members fails to continuously support the upper growth portion of the plant and subjects the plant to high pressure at the point of contact of the plant with the wire support member. This type of support can result in plant damage, plant breakage, and lower yield of tomatoes.

Thus, prior to the present invention, separate noncooperating devices were used to provide protection from weather to young plants and to provide support to mature plants. This requires additional expense in the purchasing of separate devices, additional storage when the separate devices are not in use, and additional total labor in the placing, collecting and storing of weather protecting devices followed by the labor for placing plant supporting devices.

Thus, a need has arisen for a single device which both assists the growth of a plant by providing protection from the weather for the young plant and provides continuous support to the more mature plant.

SUMMARY

The present invention solves these and other needs by providing, in the preferred embodiment, a device for assisting the growth of a plant by providing shelter from certain weather and environmental conditions for the young plant and by providing physical support to more mature plants. In the preferred embodiment of the present invention, the plant assisting device includes a lower tubular section and a collar. The collar provides a gradually curving continuous support to the upper growth portion of the plant for helping to reduce breakage of the plant from bending due to the weight of the plant. In the preferred embodiment, the collar includes arcuate sections of varying radii, with the first arcuate section connected tangentially to the tubular section, with the second arcuate section extending radially outwardly and continuously from the first arcuate section, and with the third arcuate section connected to and extending radially outwardly, downwardly, and continuously from the second arcuate section. An outer rim extends from the third arcuate section for reinforcement of the arcuate sections of the collar.

In a second aspect of the present invention, the plant assisting device is modularly constructed including a tubular section, a cover, and a collar. The collar is removably connected to the tubular section allowing the use of different materials for the collar and the tubular section and the separate fabrication of the collar and the tubular section. The cover provides a weather barrier for the plant and has a shape complementary to and for removable receipt in the tubular section and also for removable receipt in the collar.

It is thus an object of the present invention to provide a novel device for assisting the growth of a plant.

It is further an object of the present invention to provide such a novel plant assisting device which provides continuous support to the upper growth portion of the plant.

It is further an object of the present invention to provide such a novel plant assisting device of modules which can be interconnected to provide the different functions of weather protection, solar heating, and physical support to the plant.

It is further an object of the present invention to provide such a novel plant assisting device for protecting the young plant from certain weather and environmental conditions.

It is further an object of the present invention to provide such a novel plant assisting device which acts as a greenhouse for the plant.

It is further an object of the present invention to provide such a novel plant assisting device having a simple and effective anchoring means which withstands normal weather conditions during the growing season.

It is further an object of the present invention to provide such a novel plant assisting device which ventilates the plant and allows drainage of excess water.

It is further an object of the present invention to provide such a novel plant assisting device which can be nested, stacked, and handled in a compact and convenient manner for efficiency and ease of transportation, handling, and storage.

It is further an object of the present invention to provide such a novel plant assisting device of colored and translucent materials to create an aesthetically pleasing garden environment.

It is further an object of the present invention to provide a novel plant assisting device which can be manufactured and assembled easily and economically.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded, perspective view of a device for assisting the growth of a plant according to the preferred teachings of the present invention, with portions being broken away to expose the constructional details thereof.

FIGS. 2-4 show cross sectional views of the device of FIG. 1 in use according to the teachings of the present invention.

All figures are drawn for ease of explanation of the basic teaching of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "upper", "lower", "first", "second", "inner", "outer", and similar terms are used herein, it should be understood that these terms have reference only to the structure shown in the drawings as it would appear to a person viewing the drawings and are utilized only to facilitate describing the invention.

DESCRIPTION

A plant growth assisting device according to the teachings of the present invention is shown in the figures and generally designated 10. Generally, plant 11 such as a tomato plant shown includes a root portion 12 growing in soil 14, a stalk portion 16, and an upper growth portion 18.

Device 10 according to the teachings of the present invention includes a lower tubular section 20. Tubular section 20 in the preferred embodiment includes a first, lower, open end 22 and a second, upper, open end 24. In particular, tubular section 20 defines a passageway 26 having a cylindrical shape permitting growth of stalk portion 66 upwardly therethrough. Specifically, the diameter of passageway 26 is a multiple of stalk portion 16 of plant 11 and the height of passageway 26 from lower end 22 to upper end 24 of tubular section 20 is effective to surround a substantial portion of the height of stalk portion 16. Tubular section 20 tapers with the first, lower end 22 being smaller than the second, upper end 24. Tubular section 20 may be manufactured from translucent material. In its preferred form, tubular section 20 further includes an auger for insertion into and support by soil 14 shown in the preferred form of flanges 28 extending at right angles from tubular section 20 into passageway 26. The contour of flanges 28 is helical and convoluted.

Tubular section 20 in its most preferred form further includes radial holes 30 to provide ventilation to the stalk portion 16 and upper growth portion 18 of plant 11. Holes 30 are spaced from lower en 22 so that after lower end 22 has been augered into soil 14, holes 30 will be at the level of soil 14. Radial holes 30 also allow drainage of excess water from tubular section 20

In its most preferred form, second end 24 of tubular section 20 includes an upstanding lip 32 having an upper end 38. The diameter of lip 32 is slightly larger than the diameter of second end 24 of tubular section 20. The transition from circular lip 32 to second end 24 of tubular section 20 provides an annular surface 34.

Device 10 according to the teachings of the present invention includes a collar 40 slidably and removably mounted to second end 24 of tubular section 20. Collar 40 extends generally radially outward from second end 24 of tubular section 20. Collar 40 may be made from opaque material. In the preferred embodiment of the present invention, collar 40 includes a first arcuate section 42 having a first end 44, a second end 46, and a radius 48. First arcuate section 42 extends generally upward and slightly outward from second end 24 of tubular section 20. Thus, first arcuate section 42 tapers with first end 44 being smaller than second end 46. Collar 40 further includes a second arcuate section 52 having a first end 54, a second end 56 and a radius 58. First end 54 of second arcuate section 52 extends continuously generally radially outwardly and slightly upward from second end 46 of first arcuate section 42. ;Radius 58 of second arcuate section 52 is larger than radius 48 of first arcuate section 42 and in the most preferred form, radius 58 of second arcuate section 52 is a multiple of radius 48 of first arcuate section 42. Collar 40 further includes a third arcuate section 60 having a first end 62 a second end 64, and a radius 66. Radius 66 of arcuate section 60 is smaller than radius 58 of second arcuate section 52 and is larger than radius 48 of first arcuate section 42, and in the most preferred form, radius 58 of second arcuate section 52 is a multiple of radius 66 of arcuate section 60. First end 62 of third arcuate portion 60 extends contiguously generally outwardly and downwardly from second end 56 of second arcuate portion 52. Collar 40 further includes an outer rim 67 which defines a plane spaced below a plane defined by the highest portion of collar 40. Rim 67 extends contiguously generally downward and slightly outwardly from second end 64 of third arcuate section 60.

Collar 40 in the preferred embodiment further includes a lip 68 extending downwardly from first end 44 of first arcuate section 42 and having a lower end 71. The transition from the diameter of lip 68 to the diameter of first arcuate section 42 forms an annular surface 74. In the most preferred form, lips 32 and 68 have a complementary size and shape for slidably receiving lip 68 of collar 40 in lip 32 of tubular section 20. Therefore, first end 44 of arcuate section 42 may be removably connected tangentially to the second end 24 of tubular section 20. Specifically, in the most preferred form, collar 40 is slidably and removably mounted to tubular section 20 by positioning collar 40 so that lip 68 of collar 40 slides within lip 32 of tubular section 20 until lower end 71 of lip 68 of collar 40 engages annular surface 34 of tubular section 20 and annular surface 74 of collar 40 engages upper end 39 of lip 32 of tubular section 20.

Device 10 according to the preferred teachings of the present invention further includes a cover 80 having a convex surface 82. Cove 80 may be made from translucent material. Cover 80 has a shape complementary to and for removable receipt in open, upper end 24 of tubular section 20. Specifically, cover 80 in its preferred form includes a perimeter notch 84 which engages lip 32 which upstands from the second end 24 of tubular section 20 Cover 80 in the preferred form also has a shape complementary to and for removable receipt in first arcuate section 42 of collar 40. Specifically, cover 80 includes an outer edge 86 which slidably engages first arcuate section 42 of collar 40. Further, in its most preferred form, perimeter notch 84 engages annular surface 74 of collar 40. Cover 80 includes radial finger hole 88 for ease of installation and removal of cover 80. It can also be appreciated that hole 88 provide ventilation into passageway 26.

Now that the construction of plant assisting device 10 has been set forth, the use and advantages of device 10 according to the teachings of the present invention can be explained and appreciated. To illustrate the operation and advantages of the present invention, it will be assumed that a small tomato plant 11 in its early stages of growth has been planted into soil 14. Tubular section 20 may then be positioned over and around plant 11 so that lower tubular section 20 surrounds plant 11. Tubular section 20 may then be simultaneously rotated clockwise and forced downward into soil 14. It will be noted that flanges 28 extending from lower end 22 of tubular section 20 allow augering into soil 14. Flanges 28 anchor tubular section 20 to resist vertical or horizontal forces on tubular section 20. Specifically, flanges 28 extend into passageway 26 to have a sufficient area to engage soil 14 so that the weight of soil 14 above flanges 28 and the contact of soil 14 below flanges 28 provides effective anchoring but still allow plant 11 to extend between flanges 28 and through passageway 26. The user of device 10 may select the depth to which lower end 22 of tubular section 20 is embedded in soil 14 after giving consideration to the moisture content of soil 14, the density of soil 14, and the anticipated wind conditions during the growing season.

It will be appreciated that with tubular section 20 surrounding plant 11 and flanges 28 embedded in soil 14 as hereinbefore described, plant 11 is protected from the wind which could otherwise cause bending and breaking of plant 11. It may also be appreciated that plant 11 will receive protection from crawling insects and small animals when tubular section 20 is thus installed. It is to be noted that unless some particular circumstance dictates otherwise, tubular section 20 would normally remain in this position throughout the entire growth of plant 11.

Cover 80 may be installed on upper end 24 of tubular section 20 by positioning cover 80 so that perimeter notch 84 of cover 80 engages lip 32 which upstands from upper end 24 of lower tubular section 20 as best seen in FIG. 2. Thus, it can be appreciated that with cover 80 installed on lower tubular section 00, plant 11 is protected from weather conditions such as frost, excessive rain, and hail. Plant 11 is also further protected from insects, small animals, birds, and the like.

Further, due to the complete enclosure of plant 11 within passageway 26 by tubular section 20 and cover 80 and due to the solid anchoring of tubular section 20 into soil 14, plants 11 within device 10 according to the teachings of the present invention can be rapidly and easily covered by a tarp or other large covering in the event of extremely cold weather conditions. As plants 11 are protected by device 10, such tarps or other large coverings will not smash or otherwise damage plants 11 due to their weight.

With cover 80 installed on upper end 24 of tubular section 20, plant 11 is also provided with a greenhouse environment according to the teachings of the present invention. Specifically, due to the translucent material forming tubular section 20 and cover 80, plant 11 benefits from ultraviolet light passing through tubular section 20 and cover 80. Plant 11 also benefits from solar heating that takes place within passageway 26 enclosed by tubular section 20 and cover 80. It should be noted that radial holes 30 in tubular section 20 and hole 88 in cover 80 provide for ventilation and escape of excessive moisture. However, soil 14 may be temporarily positioned to cover radial hole 30 to trap in any solar heating and prevent entry of cold air during cold weather conditions.

On occasion, short term intermittent cold and warm weather conditions may make it desirable to alternately utilize and then not utilize cover 80. For example, plant 11 may benefit from exposure to the atmosphere for several days with cover 80 removed. However, should a frost warning be forecast, cover 80 may be easily installed. The ease with which the amount of exposure plant 11 has to the atmosphere is a significant advantage over prior plant protecting devices. With prior plant protecting devices, it may be necessary t remove the entire device to vary the plant exposure to the atmosphere. This removal may require the removal of securing stakes or removal of the plant protecting device from where it is embedded in the soil.

As plant 11 continues to mature, plant assisting device 10 may be prepared so that device 10 will provide physical support to the structure of the plant according to the teachings of the present invention. Specifically, cover 80 may be removed from tubular section 20 and collar 40 may be installed on upper end 24 of tubular section 20. Collar 40 may be removably mounted on tubular section 20 as hereinbefore described. It will be noted that after collar 40 is installed, cover 80 may then again be installed on collar 40 by positioning cover 80 to engage first arcuate section 42 of collar 40 as best seen in FIG. 3. The capability for continued use of cover 80 is an advantage when, for example, there is a frost warning after collar 40 has been installed. When this occurs, it is not necessary to remove collar 80 but cover 80 may be quickly installed on collar 40 and also quickly removed after the frost danger has passed.

As plant 11 continues to mature, upper growth portion 18 will reach the height of collar 40. As plant 11 continues to grow, collar 40 will guide the growth of plant 11 and provide continuous physical support to upper growth portion 18 as best seen in FIG. 4. Specifically, first arcuate section 42 of collar 40 provides a transition for upper growth portion 18 of plant 11 allowing it to continue to grow upward but at the same time to start to bush out or grow outwardly. Thus, the support provided by first arcuate section 42 of collar 40 encourages and guides growth both upward and outward. Second arcuate section 52 provides primarily outward support to upper growth portion 18 of plant 11 allowing plant 11 to continue to bush out or grow outwardly but at the same time to continue to grow upward. Third arcuate section 60 provides outward and depending support to upper growth portion 18 of plant 11 allowing plant 11 to continue to bush out or grow outwardly and to depend downwardly such that the leaves of upper growth portion 18 can maximize sunlight receiving area. Outer rim 66 increases the strength of collar 40 by increasing the rigidity of collar 40 and insures that a sharp edge is not presented by second end 64 of third arcuate section 60 in the event that collar 40 is rubbed against when working or walking by device 10.

Collar 40 and specifically arcuate portions 42, 52, and 60 thereof according to the teachings of the present invention have a shape which minimizes fruit contact therewith to reduce bruising or other damage to the fruit while maximizing support of the stems of stalk portion 16 and upper growth portion 18. Thus, collar 40 is particularly advantageous over prior plant supports in the increase of yield of usable produce.

It can then be appreciated that device 10 according to the teachings of the present invention accelerates and promotes the growth and maturity of plant 11 by providing protection from the weather and environment for the young plant and also by providing continuous physical support of the mature plant.

Now that the general use of device 10 according to the teachings of the present invention has been set forth, many advantages and subtle features of the present invention can be set forth and appreciated. For example, collar 40 encourages symmetrical and balanced growth of plant 11 by completely surrounding upper growth portion 18 of plant 11 with a uniform structural support. The support provided by collar 40 of device 10 according to the teachings of the present invention is advantageous over support provided by tying plants to tomato stakes or utilizing other prior plant supporting devices having wire support members. Plants tied to tomato stakes receive only irregular nonsymmetrical support only where the plant is tied. Prior devices having wire support members provide more uniform support but of a small area such that vines may grow beyond the support member resulting in excessive bending and breakage of the vines.

Collar 40 also supports upper growth portion 18 for greater exposure to sunlight than is received by unsupported tomato plants 11. Specifically, when upper growth portion 18 is allowed to bend downward as in prior supported or unsupported plants, less leaf area is exposed to sunlight for photosynthesis than when upper growth portion 18 is fully supported by collar 40 according to the teachings of the present invention. Further, the tomatoes of upper growth portion 18 are similarly supported and exposed to greater sunlight than in prior supported or unsupported tomato plants 11. Increased exposure to sunlight hastens the ripening process.

Collar 40 supports upper growth portion 18 so as to minimize the labor associated with the harvesting of the tomatoes. Specifically, device 10 according to the teachings of the present invention supports the tomatoes at a convenient height for easy access for harvesting. Further, it is only necessary to position device 10 once with respect to plant 11 according to the teachings of the present invention and removal and replacement and repeated repositioning is not required as in prior devices. Similarly, it is not necessary to use separate devices for weather protection and for support which requires separate labor for placement, collection, and storage and in addition to the further expense associated with two or more separate units rather than a single unit as in the utilization of device 10 according to the teachings of the present invention.

Further, due to the support provided by collar 40, the tomatoes have less of a tendency to contact soil 14 where they are more prone to rot, unevenly ripen, and be attacked by insects and the like. Thus, device 10 according to the teachings of the present invention results in a greater percentage of usable, harvestable tomatoes per plant 11.

Furthermore, collar 40 of device 10 according to the teachings of the present invention increases the moisture in soil 14 which is accessible to roots 12 of plant 11. Specifically, collar 40 functions to multiply the rainfall that would otherwise be received by root portion 12 of plant 11 by directing most of the rainfall striking collar 40 to root portion 12 of plant 11 due to the upward and outward slope and area of first and second arcuate sections 42 and 52 of collar 40. Excessive rainfall is allowed to drain from passageway 26 to the outside of tubular section 20 and away from plant 11 through holes 30 in tubular section 20. Further, due to the enclosed nature of passageway 26, soil 14 located in passageway 26 is not as susceptible to drying due to the wind. Likewise, due to the opaque nature of collar 40, collar 40 shades soil 14 adjacent plant 11 from sunlight. Therefore, moisture is not as quickly lost to the atmosphere such that it is more readily available for a longer time to plant 11.

Additionally, device 10 according to the teachings of the present invention allows soil 14 immediately outside tubular section 20 to be accessible for tilling not only when plant 11 is first planted as best seen in FIG. 2 with collar 40 not in position but also when mature since upper growth portion 18 including the tomatoes are prevented from bending and are supported above the ground in a manner best seen in FIG. 4. Tilling keeps the area surrounding device 10 weed free such that moisture will not be robbed from plant 11 by such weeds, aerates soil 14, and otherwise promotes growth of plant 11.

Device 10 in the preferred embodiment according to the teachings of the present invention is separately manufactured as three pieces, i.e., tubular section 20, collar 40, and cover 80 is further advantageous. Specifically, the molds for tubular section 20, collar 40 and cover 80 according to the preferred teachings of the present invention are less complex and less expensive than the mold required for one or two piece manufacture This manufacturing method allows different materials having different costs to be utilized. For example, collar 40 offers certain advantages if it is manufactured from colored, generally less expensive material while advantages can be achieved for tubular section 20 and cover 80 manufactured from translucent material which is typically more costly than nontranslucent material. Further, the relative sizes of the components are reduced allowing shipping by conventional, standard carriers without requiring special handling.

Device 10 according to the teachings of the present invention is also advantageous in the efficiency and ease of transporting, stocking, and handling. Due to the tapering feature of tubular section 20 and/or collar 40 and specifically first arcuate section 42 thereof, multiple tubular sections 20 and/or collars 40 may be stacked and nested together for ease in handling and efficiency in storage.

It can be appreciated that device 10 and specifically collar 40 thereof in the most preferred form can be manufactured from a plurality of colors to allow color coordination with the colors of upper growth portion 18 and/or flowers and/or fruit such as tomatoes of plant 11 and/or allow color coordination between a plurality of devices 10 or other gardening devices present.

Now that the basic teachings of the present invention have been explained, other extensions and variations may be obvious to one having ordinary skill in the art. For example, it can be appreciated that the greenhouse environment provided by the combined utilization of tubular section 20 and cover 80 or by the combination of tubular section 20, collar 40 and cover 80 could be enhanced by the addition of a heating element within lower tubular section 20 The addition of a heating element would allow device 10 to be utilized in colder climates earlier in the growing season.

Likewise it can be appreciated that the manufacturing costs for collar 40 may be reduced by using less material in collar 40. The mold for collar 40 may be developed so that arcuate sections 42, 52, and 60 of collar 40 have apertures formed therein. The apertures may also provide ventilation to the upper portion 18 of plant 11.

While a tomato plant was used to illustrate the present invention, it should be understood that device 10 may be advantageously used for many other plants such as peonies, columbines, chrysanthemums, and other plants which have a tendency to droop or fall due to the weight of fruit, foliage, or blossoms.

It can be realized that the number and location of holes 88 can be varied according to the teachings of the present invention. Likewise, other provisions allowing removal of cover 80 can be provided instead of or in addition to holes 88.

Similarly, outer rim 67 can have other shapes and/or sizes in addition to the frusto-conical configuration shown in the drawings of the present invention.

It should be noted that the removable connection between tubular section 20 and collar 40 can take other forms than lips 32 and 68 and annular surfaces 34 and 74 of the preferred form according to the teachings of the present invention. For example, first end 44 of first arcuate section 42 or an extension thereof may be provided for removable, slideable receipt in lip 32 of tubular section 20.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for assisting the growth of a plant such as a tomato plant, with the plant having a root portion growing in soil, a stalk portion having a height, and an upper growth portion, comprising, in combination: a lower tubular section defining a passageway, with the tubular section having a first end and a second end, with the first end of the tubular section having means for insertion into and support by the soil including a flange, with the passageway permitting growth of the stalk portion of the plant upwardly therethrough and being of a height effective to surround a substantial portion of the height of the stalk portion; a collar for providing a gradually outwardly curving continuous support to the upper growth portion of the plant, with the collar helping to reduce breakage of the plant from bending due to the weight of the plant and to direct water inwardly toward the plant, with the collar being connected to and extending generally radially outward from the second end of the tubular section, with the collar comprising, in combination: a first arcuate section having a first end, a second end, a radius, and a shape, with the first end of the first arcuate section connected tangentially to the second end of the tubular section, with the first arcuate section extending upwardly and outwardly from the tubular section; a second arcuate section having a first end, a second end, and a radius, with the first end of the second arcuate section extending radially outwardly and continuously from the second end of the first arcuate section, with the radius of the second arcuate section being larger than the radius of the first arcuate section, with the second arcuate section extending upwardly and outwardly from the first arcuate section to a highest point a third arcuate section having a first end, a second end, and a radius, with the radius of the third arcuate section being smaller than the radius of the second arcuate section, with the first end of the third arcuate section connected to and extending radially outwardly, downwardly, and continuously from the second end of the second arcuate section; and an outer rim extending from the second end of the third arcuate section for reinforcement of the arcuate sections.

2. The device of claim 1 further comprising, in combination: means for removably tangentially connecting the first end of the first arcuate section to the second end of the tubular section allowing the use of different materials for the collar and the tubular section and the separate fabrication of the collar and the tubular section.

3. The device of claim 2 wherein the second end of the tubular section has an annular shape, with the removably connecting means comprising an annular lip extending contiguously from the first end of the first arcuate section of the collar, with the annular lip having a shape complementary to and for removable, slidable receipt in the annular shape of the second end of the tubular section with the first end of the first arcuate section of the collar being tangentially connected to the second end of the tubular section.

4. The device of claim 3 further comprising, in combination: a cover for providing a weather barrier for the plant, with the cover having a shape complementary to and for removable receipt in the shape of the second end of the tubular section, with the shape of the cover being complementary to and for removable receipt in the first arcuate section of the collar.

5. The device of claim 4 wherein the tubular section and the cover are translucent allowing the transmission of sunlight for providing a greenhouse effect for the plant.

6. The device of claim 1 wherein the means for insertion into and support by the soil comprises an auger, with the auger including the flange extending inwardly adjacent the first end of the tubular section into the passageway, with the flange having a helical and convoluted contour for augering and anchoring into the soil, with the flange having an area for abutment with the soil to stabilize the device during windy conditions.

7. The device of claim 1 further comprising, in combination: radial holes formed in the tubular section adjacent the soil to allow ventilation to the stalk portion of the plant and drainage of excess water from the tubular section.

8. The device of claim 1 wherein the tubular section and the collar have a circular cross section.

9. The device of claim 1 wherein the tubular section tapers with the first end of the tubular section being smaller than the second end of the tubular section allowing nesting of multiple devices within one another for efficiency of storage.

10. Device for assisting the growth of a plant such as a tomato plant, with the plant having a root portion growing in soil, a stalk portion having a height, and an upper growth portion, comprising, in combination: a lower tubular section defining a passageway, with the tubular section having a first end and a second end, with the first end of the tubular section having means for insertion into and support by the soil, with the passageway permitting growth of the stalk portion of the plant upwardly therethrough and being of a height effective to surround a substantial portion of the height of the stalk portion; a collar for providing a gradually curving continuous support to the upper growth portion of the plant, with the collar helping to reduce breakage of the plant from bending due to the weight of the plant; means for removably connecting the collar to the second end of the tubular section allowing the use of different materials for the collar and the tubular section and the separate fabrication of the collar and the tubular section, with the collar extending tangentially and generally radially outward and upward from the second end of the tubular section to a highest portion; and a cover for providing a weather barrier for the plant, with the cover having a shape complementary to and for removable receipt in the second end of the tubular section, with the shape of the cover being complementary to and for removable receipt in the collar below the highest portion.

11. The device of claim 10 wherein the second end of the tubular section has an annular shape, with the removably connecting means comprising an annular lip extending contiguously from the collar, with the annular lip having a shape complementary to and for removable, slidable receipt in the annular shape of the second end of the tubular portion with the collar being tangentially connected to the second end of the tubular section.

12. The device of claim 10 wherein the tubular section and the cover are translucent allowing the transmission of sunlight for providing a greenhouse effect for the plant.

13. The device of claim 12 wherein the collar is opaque for reducing manufacturing costs and is colored for aesthetics.

14. The device of claim 10 further comprising, in combination: radial holes formed in the tubular section adjacent the soil to allow ventilation to the stalk portion of the plant and drainage of excess water from the tubular section.

15. The device of claim 10 wherein the tubular section, the collar, the removably connecting means, and the cover have a circular cross section.

16. The device of claim 10 wherein the collar comprises, in combination: a first arcuate section having a first end, a second end, and a radius, with the first end removably connected tangentially to the second end of the tubular section; a second arcuate section having a first end, a second end, and a radius, with the first end of the second arcuate section extending radially outwardly and continuously from the second end of the first arcuate section to the highest portion, with the radius of the second arcuate section being larger than the radius of the first arcuate section; a third arcuate section having a first end, a second end, and a radius, with the radius of the third arcuate section being smaller than the radius of the second arcuate section, with the first end of the third arcuate section connected to and extending radially outwardly, downwardly, and continuously from the second end of the second arcuate section; and an outer rim extending from the second end of the third arcuate section for reinforcement of the arcuate sections.

17. The device of claim 10 wherein the collar is opaque for reducing manufacturing costs and is colored for aesthetics.

18. The device of claim 10 wherein the tubular section tapers with the first end of the tubular section being smaller than the second end of the tubular section allowing nesting of multiple tubular sections within one another for efficiency of storage.

19. The device of claim 18 wherein the collar tapers to a smaller size at the connection to the tubular section allowing nesting of multiple collars within one another for efficiency of storage.

20. The device of claim 10 wherein the means for insertion into and support by the soil comprises an auger, with the auger including at least a first flange extending inwardly adjacent the first end of the tubular section into the passageway, with the flange having a helical and convoluted contour for augering and anchoring into the soil, with the flange having an area for abutment with the soil to stabilize the device during windy conditions.

* * * * *